United States Patent [19]
Palviainen et al.

[11] Patent Number: 6,167,264
[45] Date of Patent: Dec. 26, 2000

[54] METHODS FOR PROCESSING AN OUTGOING AND AN INCOMING CALL IN A MOBILE COMMUNICATIONS SYSTEM

[75] Inventors: Keijo L T Palviainen, Helsinki; Hannu-Pekka Salin, Vantaa, both of Finland

[73] Assignee: Nokia Telecommunications OY, Espoo, Finland

[21] Appl. No.: 09/011,976

[22] PCT Filed: Aug. 20, 1996

[86] PCT No.: PCT/FI96/00448

§ 371 Date: Feb. 20, 1998

§ 102(e) Date: Feb. 20, 1998

[87] PCT Pub. No.: WO97/07643

PCT Pub. Date: Feb. 27, 1997

[30]     Foreign Application Priority Data

Aug. 21, 1995  [FI]  Finland ..................................... 953917

[51] Int. Cl.[7] ...................................................... H04B 7/00
[52] U.S. Cl. ........................................... 455/433; 435/445
[58] Field of Search ................................... 455/422, 432, 455/433, 434, 435, 445, 458, 466

[56]           References Cited

U.S. PATENT DOCUMENTS

| 5,400,390 | 3/1995  | Salin .  |         |
|-----------|---------|----------|---------|
| 5,806,000 | 9/1998  | Vo et al. | 455/466 |
| 5,987,323 | 11/1999 | Huotari  | 455/466 |

FOREIGN PATENT DOCUMENTS

| 647 075 | 4/1995 | European Pat. Off. . |
| 695 105 | 1/1996 | European Pat. Off. . |

OTHER PUBLICATIONS

European Telecommunication Standard, GSM 02.02, Sep. 1994 European digital cellular telecommunications system (Phase 2), pp. 1–13.
European Telecommunication Standard, GSM 02.03, Sep. 1994 European digital cellular telecommunications system (Phase 2), pp. 1–21.
European Telecommunication Standard, GSM 04.04, Sep. 1994 European digital cellular telecommunciations system (Phase 2), pp. 1–12.
European Telecommunication Standard, GSM 04.08, Version 4.21.0, Jan. 1998, pp. 423–431.
European Telecommunication Standard, GSM 09.02, Version 4.9.0, p. 286.
European Telecommunication Standard, ETS 300 102–1, Dec. 1990, Integrated Services Digital Network (ISDN), pp. 1–213.
Mouley et al., The GSM System for Mobile Communications, Internation Standard Book No.: 2–9507190–7, pp. 216–259.

*Primary Examiner*—Thanh Cong Le
*Attorney, Agent, or Firm*—Pillsbury Madison & Sutro

[57]           ABSTRACT

Visitor location register and a method for handling an outgoing and an incoming call in a mobile communications system employing a multinumbering scheme. Signalling originating from a mobile services switching center (MSC) contains in case of a mobile-originating call the directory number of the calling subscriber and, in call forwarding, the redirecting number. This directory number is obtained from the visitor location register (VLR). All the directory numbers for different basic services of the mobile subscriber are transferred from the home location register (HLR) to the VLR. The VLR is thus capable of providing the MSC with the correct one of multiple directory numbers according to the basic service related to the call.

5 Claims, 6 Drawing Sheets

METHODS FOR PROCESSING AN OUTGOING AND AN INCOMING CALL IN A MOBILE COMMUNICATIONS SYSTEM

BACKGROUND OF THE INVENTION

The invention relates to a mobile communications system employing a so-called multi-numbering scheme, i.e. different subscriber numbers for different teleservices of the subscriber.

In addition to conventional data transmission, modern mobile communications systems provide the subscribers with a variety of data transfer features. The services provided by the mobile communications systems may generally be divided into Teleservices and Bearer Services. A bearer service is a telecommunication service that allows transmission of signals between user-network interfaces. An example of bearer services are modem services. In a teleservice, the network also provides terminal equipment services. Examples of major teleservices, in turn, are speech, telefax and videotext services.

One mobile subscriber may typically have a right to different teleservices and bearer services, which are herein generally referred to as basic services. The subscriber may have an access e.g. to speech, telefax and data services. A mobile-terminating or mobile-originating call may thus require any of these basic services, for which reason the correct service must be addressed to the mobile communications network. E.g in the pan-European GSM mobile communications system GSM, call set-up signalling transmitted by a mobile station contains information on the required basic service in a specific Bearer Capability Information Element BCIE. The mobile network may thus choose the appropriate basic service for the mobile-originating calls. Calls received from an ISDN (Integrated Services Data Network) also contain a similar information element that indicates the service required. In case a call originates from or is routed via the public switched telephone network (PSTN), however, information on the type of the call will not be transmitted to the mobile communications network. In such a case, the network should be informed some other way which basic service the call requires.

A prior art solution to the above problem is a Multinumbering Scheme, in which a mobile subscriber has a number of directory numbers corresponding to the number of services to which he wishes to receive incoming calls. A directory number is also termed as a Mobile Subscriber ISDN Number (MSISDN). A subscriber may have a directory number e.g. for a speech service, a telefax service and a modem service. In accordance with the Multinumbering Scheme, a calling subscriber dials the directory number of the mobile subscriber according to the desired service. In the pan-European mobile communications network, the services of the subscribers are determined in a subscriber's home location register HLR, in which other subscriber information is also stored permanently. The HLR is also used for storing information on the mapping between the directory numbers and the services of the subscriber. In the HLR, a specific BCIE element indicating the type of a call and the network resources required for the call is also linked with the directory number (MSISDN). A BCIE is described e.g. in GSM Recommendation 04.08, version 4.5.0, pp. 423–431. The HLR also contains an IMSI (International Mobile Subscriber Identity) which is used within the GSM network. A mobile subscriber has only one IMSI, which is common to all the basic services.

The GSM system also has another location register, a visitor location register VLR, into which part of the subscriber data stored in the HLR is copied when the subscriber is located within the area of the VLR.

FIG. 2 illustrates call set-up of a mobile-terminating call in the GSM mobile communications system employing a multinumbering scheme. In step 1, the call arrives at the first gateway MSC (GMSC) of the network. The GMSC will send a routing information request (message 2) to the HLR of the subscriber, said HLR being determined on the basis of the directory number MSISDN of the subscriber. Along with the routing information request message 2, the MSISDN of the subscriber (and possibly ISDN BCIE+HLC+LLC) is also transmitted. In connection with a location updating, the information on the VLR in whose area the subscriber is located has been updated in the HLR of the subscriber. On the basis of that information, the HLR will transmit to the VLR a roaming number request (message 3). Along with the roaming number request, the VLR will also be provided with the IMSI of the mobile subscriber and the BCIE related to the called MSISDN (or an ISDN BCIE received along with message 2). The BCIE indicates e.g. the network resources required by the call, but not directly the type of the basic service. The VLR will store the BCIE it has received and allocate a Mobile Station Roaming Number MSRN. The VLR will transmit the allocated roaming number to the HLR along with an response message 5. The HLR, in turn, will forward the roaming number to the GMSC that has requested the routing information in a message 6. The roaming number space has been determined so that it will route the call every time to the MSC whose VLR has allocated the roaming number. The GMSC may thus route the call further on the basis of the roaming number MSRN by transmitting an initial address message 7 to the mobile services switching centre MSC indicated by the roaming number.

After receiving the initial address message 7, the MSC will detect in a roaming number analysis that the call is terminating within the area of the same MSC, and it is not intended to be routed further. The MSC will thus request call set-up information on the called subscriber from its own VLR (message 8). The VLR will normally return the information required in the response message 9, said information containing e.g. the BCIE. Provided that the MSC is able to provide the data transmission resources required by the BCIE, call set-up signalling will be carried out between the MSC and the MS. The signalling is illustrated with arrows 10 and 11.

A supplementary service provided by the mobile communications systems is call forwarding, which may be activated by the subscriber. Call forwarding may be call forwarding unconditional, in which case a call is forwarded to a given new number every time. Call forwardings of this kind are usually carried out by the HLR. Call forwarding may be determined to take place conditionally, that is, in case the subscriber is busy, the subscriber does not answer or the subscriber is not available. For call forwarding procedures of this kind, information on the status of the subscriber (available/busy) or progressing of the call set-up is required, and they are therefore carried out by the VLR/MSC.

With reference to FIG. 3, let us study a call set-up procedure of a mobile-terminating call, associated with call forwarding conditional in the mobile services switching centre MSC serving the mobile station. In FIG. 3, the call set-up messages and steps 1, 2, 3, 4, 5, 6, 7 and 8 are completely similar to those explained above in connection with FIG. 2. When the VLR receives a subscriber data request 8 from the MSC in the case shown in FIG. 3, the VLR will detect e.g. that the mobile station is busy. The VLR will then check from the subscriber data whether the mobile station has activated call forwarding conditional in case the subscriber is busy. The VLR will detect that the subscriber has call forwarding conditional to a specific call forwarding number, and transmit to the MSC an response message 9, in which the MSC is commanded to forward the call to the number provided. Along with signalling related to call forwarding, an Original Called Number OCD and a Redirecting Number will also be forwarded. In some types of signalling, only one number is transmitted, in which case the number is the Redirecting number.

In a system in accordance with the GSM Recommendations, only a MSISDN in accordance with a Primary Service, a Primary MSISDN, is transmitted from the HLR to the VLR, although a multinumbering scheme would be in use. The primary MSISDN is usually the MSISDN of the speech service. For this reason, the Primary MSISDN, usually a speech MSISDN, is also transmitted as a redirecting number and an OCD indication in call forwarding, although the call to be forwarded would have been received e.g. to the MSISDN number of the telefax service.

A similar problem also arises in connection with mobile-originating calls. The MSC transmits the called subscriber the call set-up message of the MSISDN number of the calling subscriber in a Calling Line Identity (CLI) field of the calling subscriber. Since the MSC receives the MSISDN number from the VLR, the CLI is presently represented by the MSISDN, usually the speech MSISDN, of the primary service every time, although the call would be a telefax call. There are automatic call-back telefax terminals, which call back to the number of the calling subscriber in case the telefax has been busy when it has been called. The call will take place on the basis of the identity CLI of the calling subscriber. When the CLI of the calling telefax terminal is now a speech MSISDN, the called telefax terminal will make a call to that speech MSISDN, and the mobile network will establish a speech call instead of a telefax call.

BRIEF SUMMARY OF THE INVENTION

An object of the invention is a mobile communications system in which, when employing a multinumbering scheme, a directory number corresponding to the actual service of the call is transmitted along with an originating or redirected call.

This is achieved with a visitor location register of the invention in a mobile communications system employing a multinumbering scheme. The visitor location register is characterized in that the visitor location register is arranged to subscriber-specifically store the basic service codes related to the basic services of a subscriber, and the directory numbers linked with the service codes, said directory numbers and basic service codes having been transmitted from the home location register of the subscriber, the visitor location register is arranged to transmit to a mobile services switching centre a directory number corresponding to the basic service related to the call, said directory numbers being used as the directory number of the calling subscriber in mobile-originating calls or as the redirecting number in mobile-terminating calls for which a call forwarding controlled by the visitor location register is carried out.

The invention further relates to a method for handling a mobile-terminating call in a mobile communications system employing a multinumbering scheme.

The invention further relates to a method for handling a mobile-originating call in a mobile communications system employing a multinumbering scheme.

In accordance with the invention, all the directory numbers linked with the different basic services of the subscriber, and the service codes linked with the directory numbers are transmitted from the home location register to the visitor location register. This will allow the visitor location register to provide the mobile services switching centre with a correct directory number according to the basic service of the call, to be used as the directory number of the calling subscriber in mobile-originating calls, and as the redirecting number in mobile-terminating calls. The service code used for selecting the correct directory number is obtained from the mobile services switching centre in originating calls, or it is derived from the Bearer Capability Information Element obtained from the home location register in terminating calls.

BRIEF DESCRIPTION OF THE SEVERAL VIEWS OF THE DRAWING

In the following, the invention will be described in more detail by means of preferred embodiments with reference to the attached drawings, in which.

DETAILED DESCRIPTION OF THE INVENTION

The present invention is suited for mobile communications systems in which circuit switched data and speech calls may be established. The invention is specifically suited for the pan-European digital mobile communications system GSM (Global System for Mobile Communications) and similar modern mobile communications systems, such as DCS1800 (Digital Communication System) and PCN (Personal Communication Network). In the following, the preferred embodiment of the invention will be disclosed in connection with the GSM system. The invention is not limited thereto, however.

Figure 1:
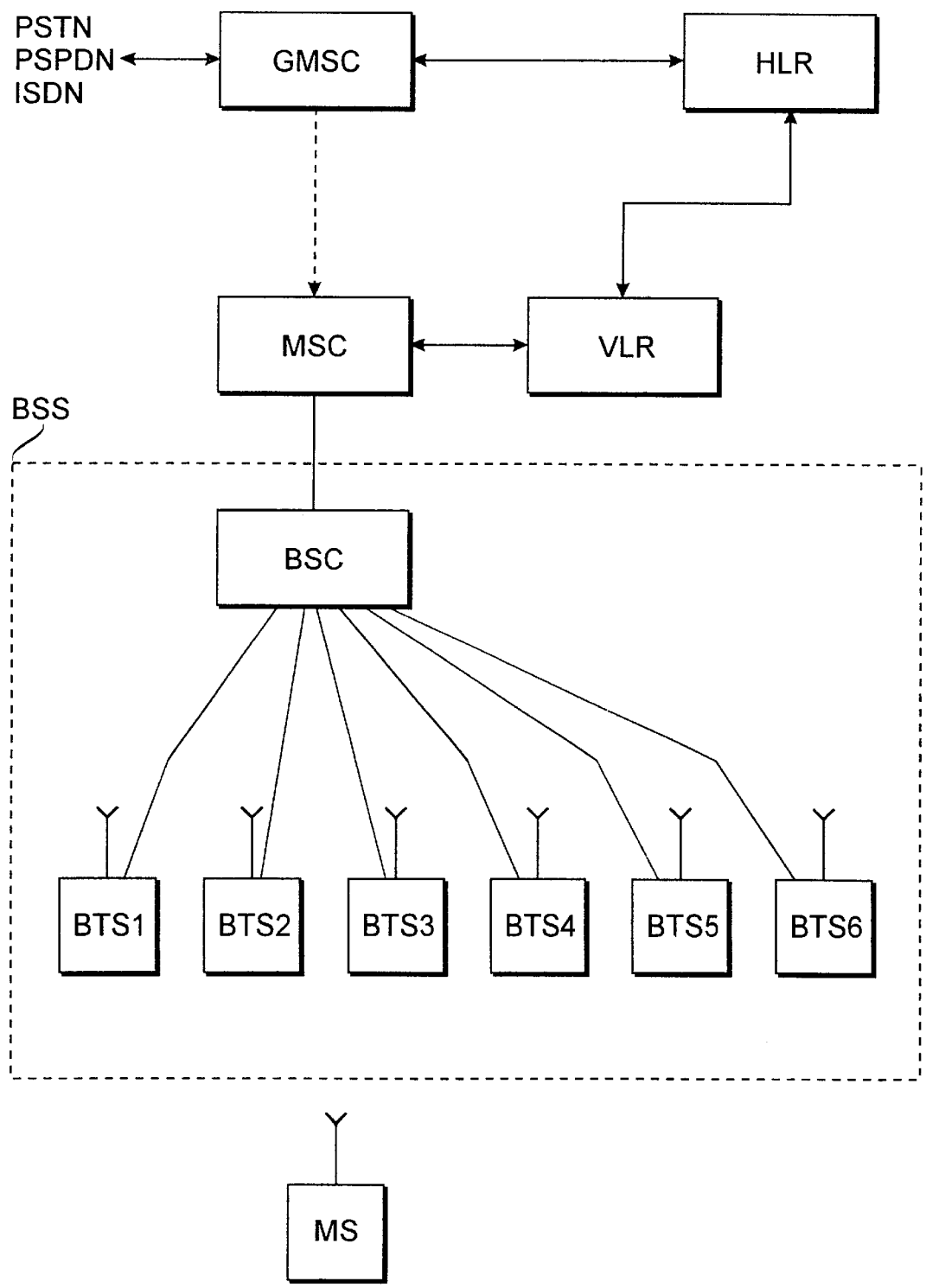
FIG. 1 shows a part of a mobile communications system.

FIG. 1 shows briefly the basic structure of the GSM system, without paying closer attention to its features or other aspects of the system. The GSM system is disclosed in more detail in the GSM Recommendations and in "The GSM System for Mobile Communications", M. Mouly & M. Pautet, Palaiseau, France, 1992, ISBN:2-9507190-0-0-7, which are incorporated herein by reference.

A mobile services switching centre MSC handles switching of incoming and outgoing calls. It carries out functions similar to those of an exchange of a public switched telephone network PSTN. In addition, it also carries out tasks typical of mobile telecommunication only, such as subscriber location management in cooperation with the subscriber location registers of the network. The subscriber location registers of the GSM system are the home location register HLR and the visitor location register VLR. Mobile stations MS are connected to a mobile services switching centre MSC by means of base station systems. A base station system BSS consists of base station controllers BSC and base stations BTS. One base station controller BSC is used for controlling a plurality of base stations BTS. For the sake of clarity, FIG. 1 shows one base station system only, in which six base stations BTS1–BTS6 are connected to one base station controller BSC.

As it has been explained above, present-day mobile communications systems support various teleservices and network services. The network services provided by the GSM system are specified in the GSM Recommendation GSM 02.02, version 4.2.0 and the teleservices in Recommendation GSM 02.03. A dedicated teleservice code and a dedicated network service code have been defined for each teleservice and network service, respectively, in recommendation GSM 09.02. A binary teleservice code for telephony service is 00010001 and that for the facsimile group 3 is 01100001. All the service codes will be termed herein as basic service codes.

One mobile subscriber may be entitled to different teleservices and network services, which are herein generally referred to as basic services. As explained above, it is thus advantageous to employ a multinumbering scheme, in which each basic service is provided with an individual directory number MSISDN.

Figure 4:
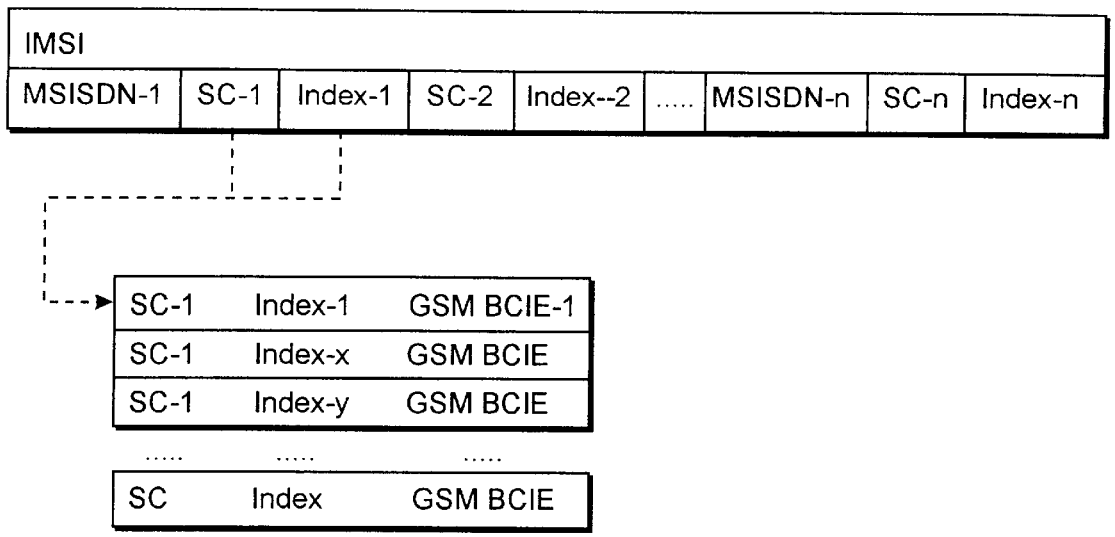
FIG. 4 shows the principle of a data structure used for determining the services of the subscriber in the home location register.

In the GSM system, the services of the subscribers are defined in the home location register HLR in connection with the other subscriber data. FIG. 4 shows an example of the principle of a data structure that determines n basic services for one subscriber. The other subscribers have a similar data structure stored in the HLR. Each subscriber has an individual IMSI (International Mobile Subscriber Identity), which is used as the subscriber identity within the mobile network. The services determined for the subscriber are linked with the IMSI of the subscriber. In accordance with the principle of the multinumbering scheme, each service 1 . . . n of the subscriber is provided with an individual directory number MSISDN-1 . . . MSISDN-n. One basic service code SC-1 . . . SC-n will be linked with each MSISDN number, for determining the service. The basic service code is one of the teleservice and network service codes mentioned above. There may be a plurality of values of the Bearer Capability Information Element BCIE, that is, different network requirements for each basic service code SC. In accordance with a preferred embodiment of the invention, an index indicating the GSM BCIE value used by the subscriber is thus linked with the MSISDN number. In other words, the index points to the table of the GSM BCIE values. The GSM BCIE is an information element in which the information on all the network requirements related to the call, such as data transfer rates, the number of data bits and stop bits, etc. are transmitted in the GSM system. The index enables two subscribers to have the same basic service, e.g. 2400 kbit/s, but a different number of data bits and stop bits. The BCIE is disclosed e.g. in GSM Recommendation 04.04, version 4.5.0, pp. 423–431.

In the future, it will be possible to use parallel with the above mentioned GSM BCIE an ISDN BCIE, which is specified in Recommendation ETS 300102-1/Q.931 (Bearer Capability IE). This information element is not directly connected to the indication of the call type, and information elements High Layer Compatibility (HLC) or Low Layer Compatibility (LLC) are therefore used along with it. These elements are defined in Recommendations ETS 300102-1/ Q.931 HLC and ETS 300102-1/Q.931 LLC. The ISDN BCIE (as well as HLC and/or LLC) may be transmitted to the mobile services switching centre from the fixed network along with a call set-up message.

Figure 2:
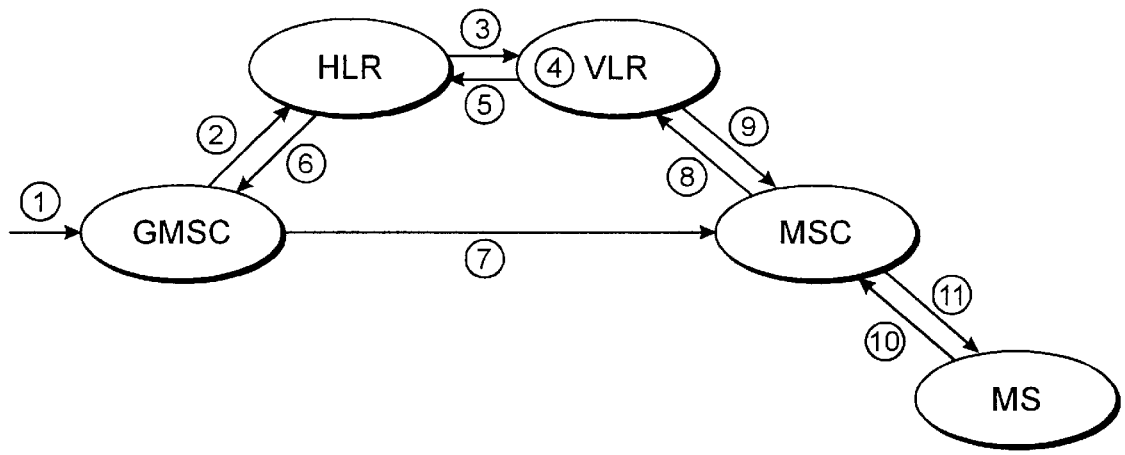
FIG. 2 illustrates a successful call set-up procedure in the GSM system.

The GSM system also has another subscriber location register, a visitor location register VLR, which is typically a database serving one mobile services switching centre MSC, but it may also serve a plurality of MSC's. Part of the subscriber data stored in the HLR is copied to the VLR when the subscriber is located in the area of the VLR. In the present GSM system, determinations of the services of the subscriber, illustrated in FIG. 4, are not copied from the HLR to the VLR. The VLR is provided with one MSISDN only, which is used e.g. for call forwardings and originating calls in order to identify a redirecting or calling subscriber, even though the multinumbering scheme would be in use. This will cause problems described above. Similarly, in the roaming number request carried out by the HLR to the VLR (cf. FIG. 2, message 3), the IMSI and the BCIE are transferred, not the MSISDN.

Figure 5:
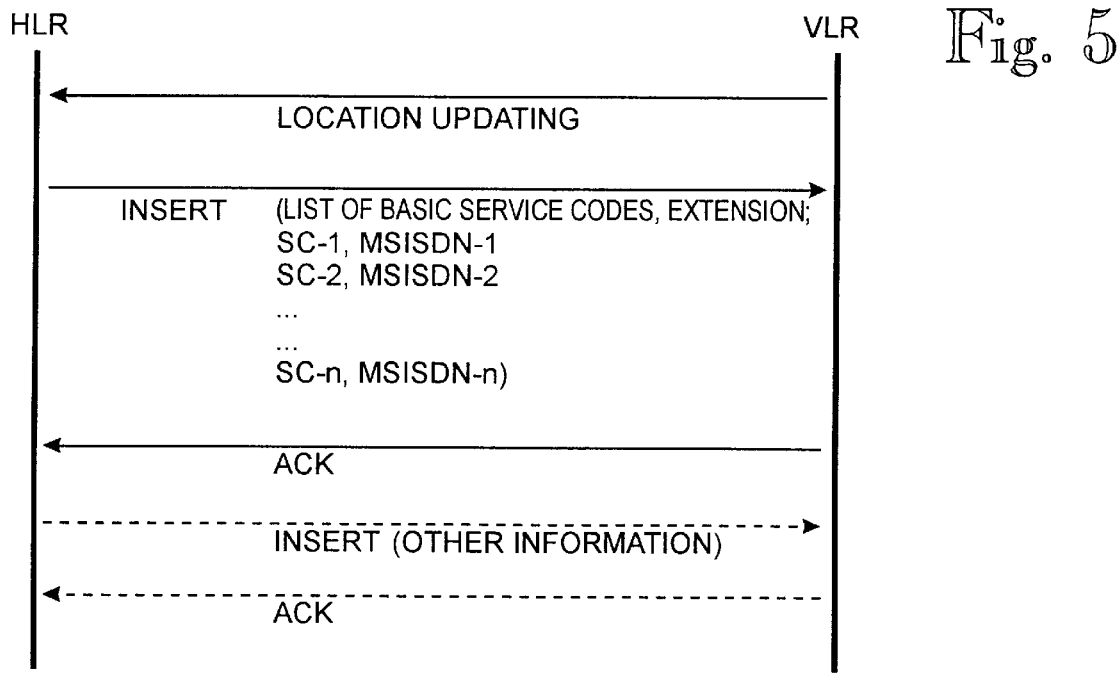
FIG. 5 shows a signalling diagram illustrating the transmission of the directory numbers of the subscriber in accordance with the invention from the HLR to the VLR.

In the present invention, the HLR provides the VLR, in addition to the standard subscriber data, with all the directory numbers MSISDN-1 . . . MSISDN-n of the subscriber linked with the basic service codes SC-1 . . . SC-n. In other words, the HLR transmits pairs MSISDN-1/SC-1, MSISDN-2/SC-2, etc. This takes place e.g. in an INSERT message in which the subscriber data and the list of basic service codes are usually transferred to the VLR e.g. in association with location updating, as illustrated in the signalling diagram in FIG. 5. In accordance with the invention, the message is provided with an extension for the inventive additional information. The VLR acknowledges every INSERT message, which may be repeated one after another in case the information will not go in one message. A standard INSERT message is defined in Recommendation GSM 09.02, version 4.9.0, page 286.

In the following, example I will show an ASN.1 description of InsertSubscriberData operation in accordance with GSM Recommendations, and example II will show an InsertSubscriberData operation with an extension according to the invention. The solution shown does not require any changes to the GSM Recommendations. Another alternative is e.g. to carry out an extension in accordance with the invention inside existing Bearer and Teleservice lists or instead of them, which would, however, require changes to the GSM Recommendations.

EXAMPLE I

ASN.1 description in accordance with GSM Recommendation 09.02 of the InsertSubscriberData operation:

```
InsertSubscriberDataArg: : =SEQUENCE
imsi              [0]               IMSI OPTIONAL,
COMPONENTS OF                       SubscriberData
SubscriberData : : = SEQUENCE
msisdn            [1] ISDN-AddressString   OPTIONAL,
category          [2] Category             OPTIONAL,
subscriberStatus  [3] SubscriberStatus     OPTIONAL,
bearerServiceList [4] BearerServiceList    OPTIONAL,
teleserviceList   [6] TeleserviceList      OPTIONAL,
provisionedSS     [7] SS-InfoList          OPTIONAL,
odb-Data          [8] ODB-Data             OPTIONAL,
-- OA1 odb-Dta must be absent in version 1
roamingRestrictionDueToUnsupportedFeature [9] NULL OPTIONAL,
-- OA1 RoamingRestrictionDueToUnsupportedFeature must be absent
-- in version 1
regionalsubscriptionData [10]    ZodeCodeList    OPTIONAL
-- OA1 RegionalSubscriptionData must be absent in version 1
```

EXAMPLE II

GSM Recommendation GSM 09.02 allows the use of an extension, whereby the ASN.1 description of the INSERT message in accordance with the invention may be e.g. as follows:

```
InsertSubscriberDataArg : :=SEQUENCE
imsi              [0] IMSI                 OPTIONAL,
COMPONENTS OF         SubscriberData,
isdExt            [PRIVATE 0] IsdExt       OPTIONAL
IsdExt : := SEQUENCE
basicServiceDataList [1] BasicServiceDataList   OPTIONAL
BasicServiceDataList : := SEQUENCE SIZE (1 . . . maxNumOfBasicServices)
OF                    BasicServiceData
BasicServiceData : := SEQUENCE
basicService         BasicServiceCode      OPTIONAL,
msisdn               [2] IsdnAddressString OPTIONAL
```

Figure 6:
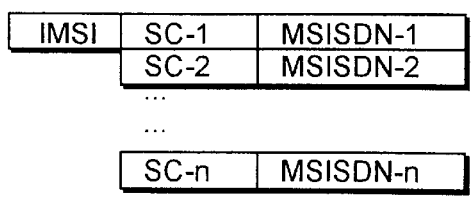
FIG. 6 shows the principle of a data structure that maps the directory numbers and the service codes of the subscriber in the visitor location register.

The VLR stores the directory numbers MSISDN-1 . . . MSISDN-n, as well as the basic service codes SC-1 . . . SC-n along with the IMSI of the subscriber. The principle of the data structure that may be used by the VLR for this purpose is illustrated in FIG. 6. The subscriber has one IMSI with which the basic service codes SC-1 . . . SC-n are linked. Each basic service code SC-1 . . . SC-n, is linked with a corresponding directory number MSISDN-1 . . . MSISDN-n. The basic service code thus functions as an index of the correct directory number MSISDN. In mobile-originating calls (MO) the VLR may thus return to its mobile services switching centre MSC the directory number MSISDN corresponding to the actual basic service related to the call. Said MSISDN is then set by the MSC as the identifier of the calling subscriber CLI. Possible reverse charge calls are thus made to the directory number corresponding to the correct basic service. Similarly, when the VLR controls transfer of a mobile-terminating call (MT), it may return the MSISDN corresponding to the basic service of the call to be transferred to the MSC, and the MSC then sets said MSISDN as the redirecting number and/or the original called number OCD.

In the following, call set-up of a mobile-originating call will be described with reference to FIGS. 7 and 8.

Figure 7:
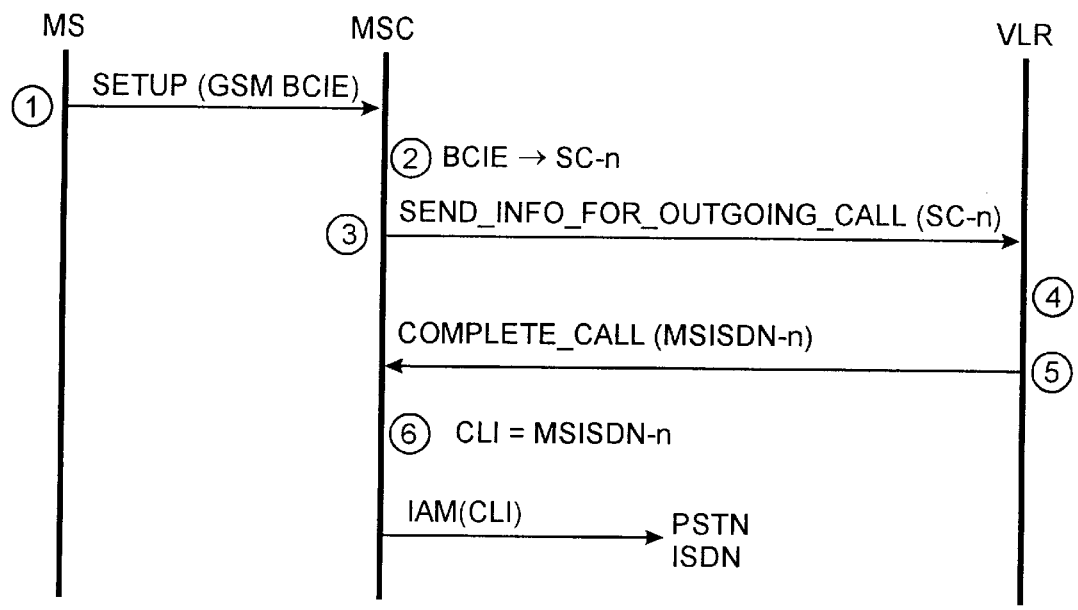
FIG. 7 is a signalling diagram illustrating call set-up of a mobile-originating (MO) call.
Figure 8:
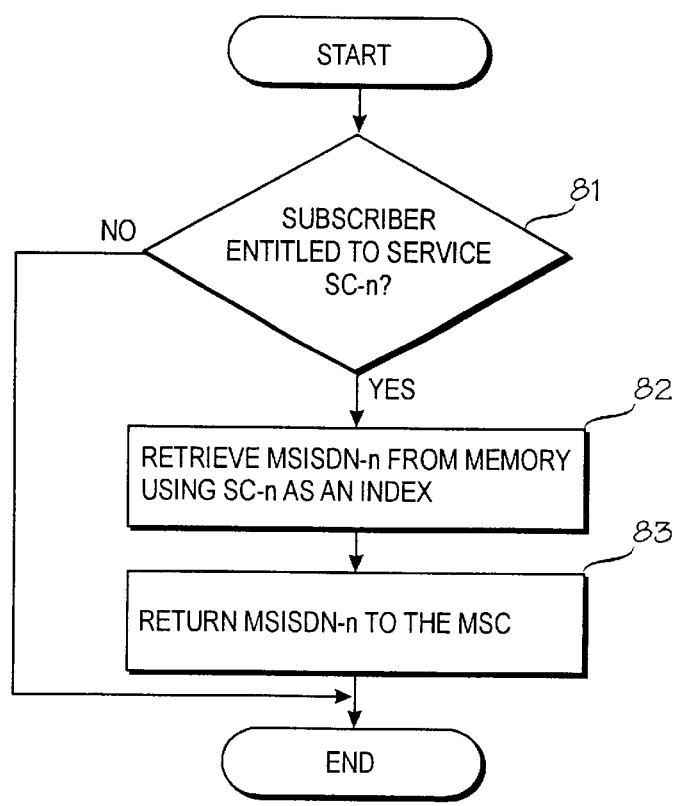
FIG. 8 is a flow chart illustrating the operation of a VLR in accordance with the invention in a MO call.

In FIG. 7, the mobile station MS transmits a call set-up message SETUP to the MSC in step 1. The calling MS will select a data service by determining the transfer features to the GSM BCIE element, which will be inserted in the SETUP message. In case of alternating speech and data, the SETUP message contains two GSM BCIE elements. In step 2, the MSC will produce a network or teleservice code SC-n from the transfer features contained in the GSM BCIE, and this code is a basic service code in accordance with the invention. This is a standard MSC function based on the analysis of the BCIE element. In the following, a few examples will be given how the conversion may be carried out. If the Information Transfer Capability (ITC) of the BCIE element in octet 3 is 000 (bits 1, 2 and 3), for instance, Telephony=00010001 may be chosen as the basic service code. If the ITC value of the BCIE element is 011, then Automatic Facsimile Group 3=01100010 will be chosen as the basic service code. The analyses and conversion disclosed above are only shown by way of example. In practice, the conversion may be carried out by any suitable analysis.

The MSC will thereafter request subscriber data by providing the VLR with a send—info—for—outgoing—call message, which also contains the basic service code SC-n just produced (FIG. 7, step 3). In step 4, the VLR will take the standard measures associated with this kind of a database interrogation. The VLR also contains a data structure similar to that in FIG. 6, linking each basic service code SC with a specific directory number MSISDN. With reference to FIG. 8, the VLR will check whether the subscriber is entitled to the basic service the basic service code SC-n corresponds to (step 81). This is a standard VLR function in which it is e.g. checked whether the subscriber data contains the basic service code in question or a service corresponding to it. If this is not the case, the procedure will end immediately in FIG. 8, and call set-up will be continued in a way determined for such a situation. If the subscriber is entitled to the basic service SC-n, the VLR will retrieve from the data structure of FIG. 6 the directory number MSISDN-n corresponding to the basic service code SC-n (step 82) and return the retrieved MSISDN-n to the MSC e.g. in a complete—call message (step 83 in FIG. 8, step 5 in FIG. 7). Thereafter, the MSC will set the directory number MSISDN-n corresponding to the basic service as the identity of the calling subscriber CLI (step 6) and forward it in the initial address message IAM e.g. to a public switched telephone network PSTN or to an ISDN network.

Figure 9:
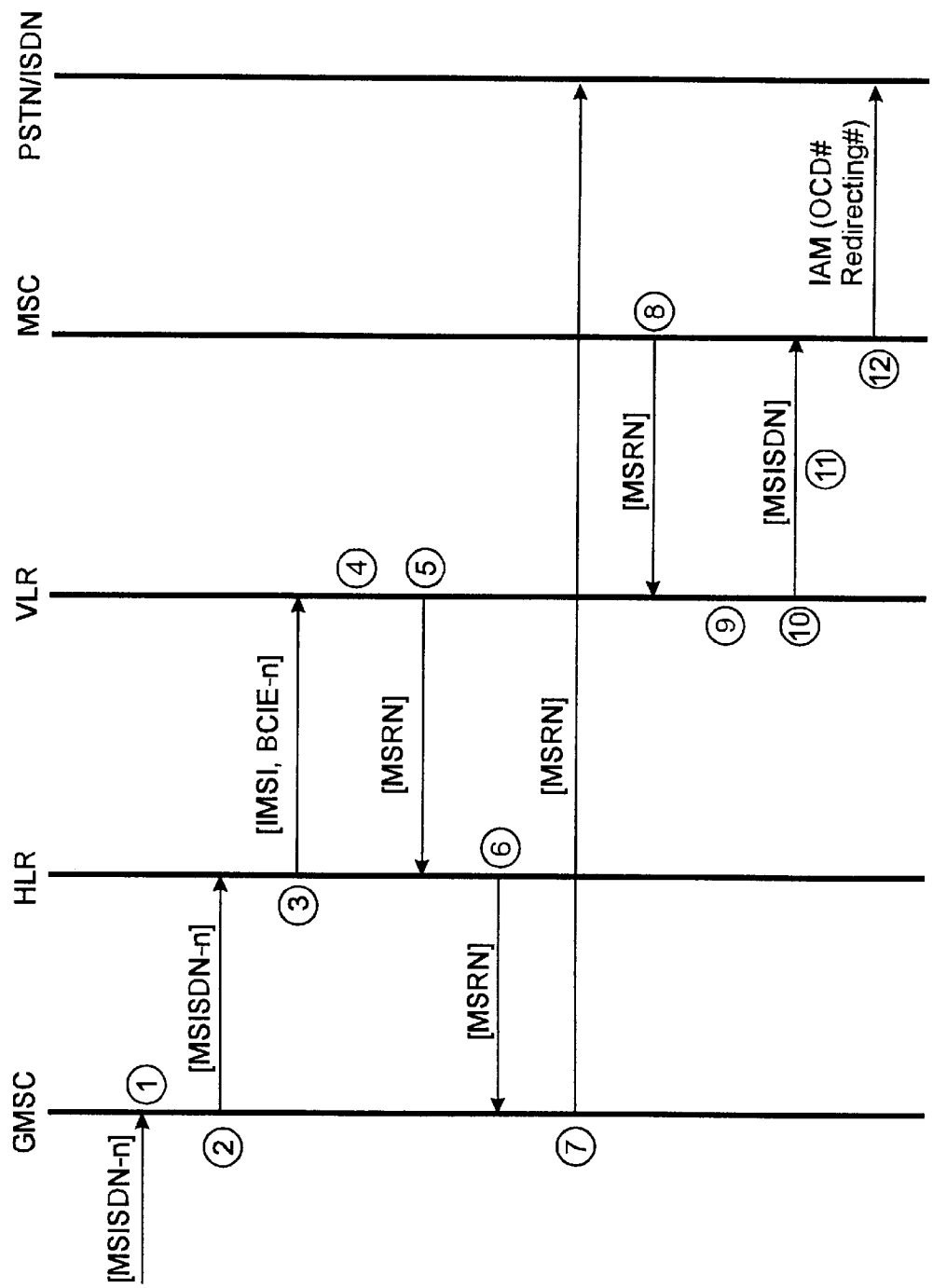
FIG. 9 shows a signalling diagram illustrating call set-up of a mobile-terminating (MT) call.
Figure 10:
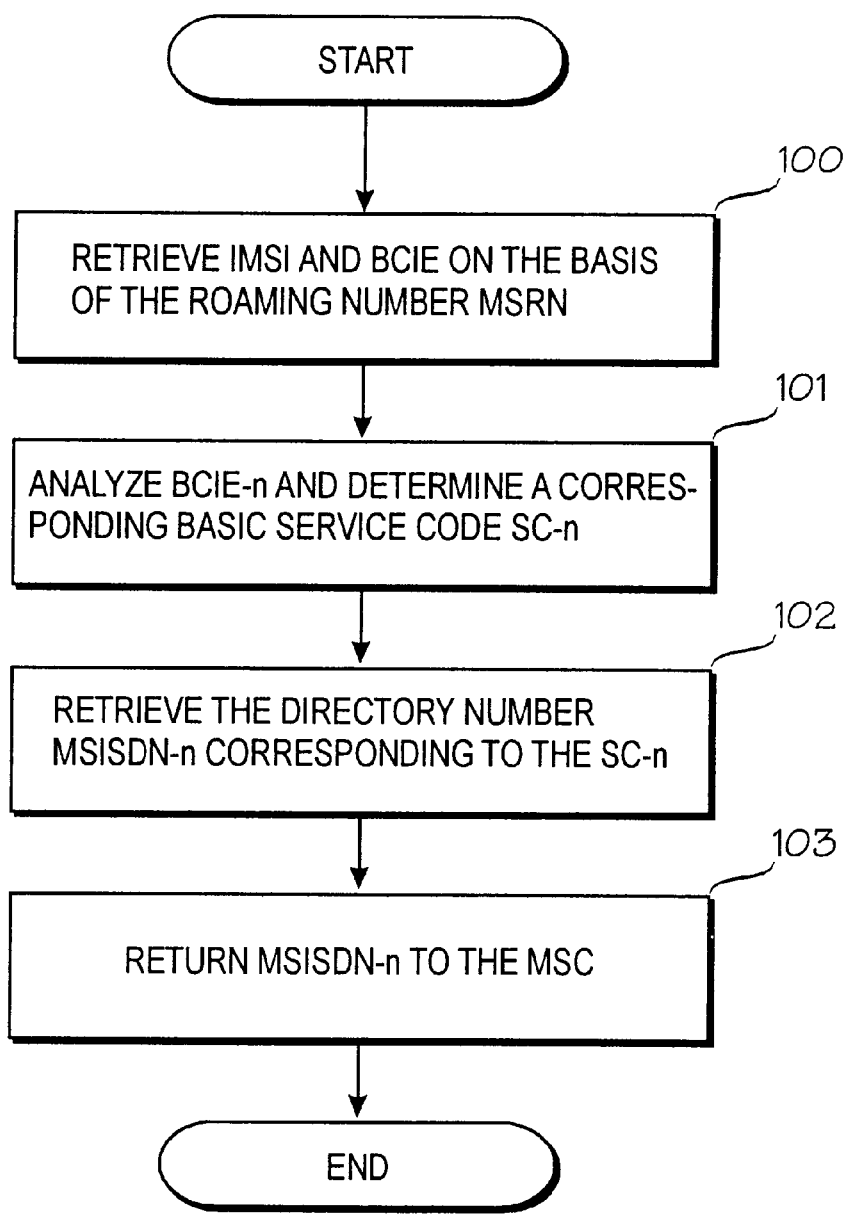
FIG. 10 is a flow chart illustrating the operation of a VLR in accordance with the invention in a MT call.

In the following, call set-up of a mobile-terminating call will be described with reference to FIGS. 9 and 10. FIG. 9 largely corresponds to the diagram in FIG. 3.

Figure 3:
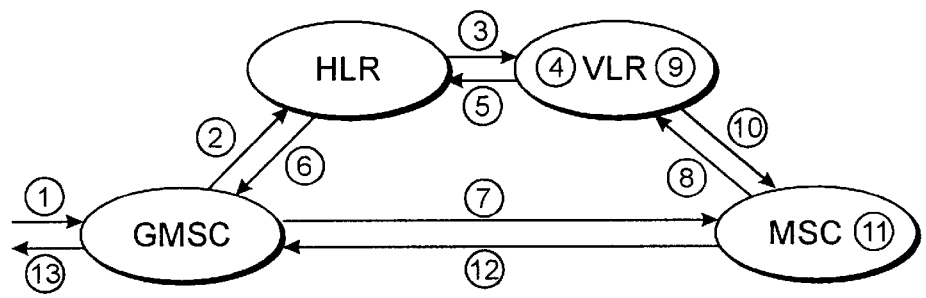
FIG. 3 illustrates a call set-up procedure including call forwarding in the GSM system.

FIG. 9 corresponds to signalling in FIG. 3 to a great extent, also as regards the reference numbers. For the sake of clarity, FIG. 9 does not show message names at the signalling arrows, but only the information content of the messages, essential to the invention. The information content is marked in square brackets.

In step 1, a call arrives at the first GMSC of the network, and this GMSC transmits a routing information interrogation (message 2) to the HLR of the subscriber, said HLR being determined in accordance with the directory number M of the subscriber. Along with the routing information interrogation message 2, the MSISDN number of the subscriber (and possibly also ISDN BCIE+OLC+LLC) will also be transmitted. The HLR will retrieve from a data structure in accordance with FIG. 4 the IMSI-n of the subscriber and the GSM BCIE on the basis of the called directory number MSISDN-n. The HLR will then transmit the VLR a roaming request message 3, which contains the IMSI-n of the subscriber and the bearer capability information element BCIE-n corresponding to the basic service in question. In step 4, the VLR will provide the call with a roaming number MSRN and store the received IMSI and BCIE-n linked with this roaming number. The VLR will forward the roaming number MSRN it has reserved to the HLR in an response message 5. The HLR, in turn, will forward the roaming number MSRN to the GMSC in message 6. The GMSC will route the call further by transmitting an initial address message 7 to a mobile services switching centre MSC indicated by the MSRN. After receiving the initial address message 7, the MSC will detect in the roaming number analysis that the call is terminating within the area of the same MSC, and is not intended to be routed any further. The MSC will then request from its own VLR the information related to the called subscriber for call set-up, message 8. In addition to its normal operations, the VLR will thus carry out a procedure in accordance with FIG. 10 for obtaining a directory number MSISDN-n corresponding to the basic service. In FIG. 10, the VLR will first retrieve (step 100) the IMSI-n and the BCIE-n from its memory on the basis of the roaming number MSRN. Said IMSI-n and BCIE-n were stored earlier in step 4. The VLR will then analyze the BCIE information element and determined a corresponding basic service code SC-n (step 101). This analysis and determining may be carried out e.g. in the same way as the analysis carried out by the MSC in step 2 in FIG. 7. After obtaining the basic service code SC-n, the VLR will retrieve from the data structure shown in FIG. 6 the directory number MSISDN-n corresponding to this basic service code (step 102). The VLR will then return this directory number MSISDN-n of the basic service to the MSC (step 103 in FIG. 10, step 10 in FIG. 9). Later during call set-up, a call forwarding situation is detected (step 11), in which case the MSC will set the MSISDN-n it received from the VLR as the Redirecting Number of an MS-originating call set-up message IAM (step 12). The same MSISDN-n will also be set as the original called number OCD provided that the call is being forwarded for the first time.

The figures and the explanation associated therewith are only intended to illustrate the present invention. In details the invention may vary within the scope of the attached claims.

What is claimed is:

1. A visitor location register (VLR) in a mobile communications system employing a multinumbering scheme, wherein the visitor location register is arranged to subscriber-specifically store basic service codes (SC-1 . . . SC-n) related to basic services of a subscriber, and directory numbers (MSISDN-1 . . . MSISDN-n) linked with the service codes, said directory numbers and basic service codes having been transmitted from a home location register (HLR) of the subscriber, the visitor location register is arranged to transmit to a mobile services switching center (MSC) a directory number corresponding to the basic service related to the call, said directory number being used as the directory number of the calling subscriber in mobile-originating calls or as a redirecting number in mobile-terminating calls for which a call forwarding controlled by the visitor location register is carried out.

2. A visitor location register as claimed in claim 1, said register being arranged to determine the basic service code (SC-1 . . . SC-n) of a call from a Bearer Capability Information Element (BCIE) received from the home location register.

3. A method for handling a mobile-terminating call in a mobile communications system employing a multinumbering scheme, comprising the steps of:

receiving a call to a first mobile services switching center, performing a routing information interrogation to a home location register indicated by a directory number of the called subscriber, retrieving from the home location register, on the basis of said directory number, an internal subscriber identity of the mobile network, said identity being common to all the basic services of the subscriber, as well as a bearer capability information element corresponding to said directory number, transmitting, from the home location register to the visitor location register in the area of which the called subscriber is located, a roaming number request containing said subscriber identity and said bearer capability information element, allocating a roaming number for the call, storing the roaming number, said subscriber identity and said bearer capability information element, transmitting the allocated roaming number from the visitor location register to the home location register and further to the first mobile services switching center, routing the call on the basis of the roaming number from the first mobile services switching center to a second mobile services switching center serving the area of the visitor location register, and carrying out a subscriber data interrogation from the second mobile services switching center to the visitor location register, wherein the method further comprises the steps of:

generating from said bearer capability information element a service code in the visitor location register, retrieving said subscriber's directory number corresponding to said service code, said directory number being stored in the visitor location register when transferring the information from the home location register, and transmitting said directory number to the second mobile services switching center that has carried out the routing information interrogation, setting said directory number as the redirecting number in mobile-originating call set-up signalling provided that a call forwarding controlled by the visitor location register is carried out for the call.

4. A method as claimed in claim 3, further comprising setting said directory number as the original called directory number provided that said call forwarding is the first forwarding carried out for said call.

5. A method for handling a mobile-originating call in a mobile communications system employing a multinumbering scheme, comprising the steps of:

transmitting from a mobile station to a mobile services switching center a call set-up message containing a bearer service information element, generating from said bearer capability information element a basic service code in the mobile services switching center, carrying out a subscriber data interrogation to the visitor location register, said interrogation containing said basic service code, wherein said method further comprises the steps of:

retrieving in the visitor location register a directory number of the subscriber, corresponding to said basic service code, said directory number being stored in the visitor location register when transferring the subscriber data from the subscriber's home location register, transmitting said directory number to the mobile services switching center, and setting said directory number as the directory number of the calling subscriber in mobile-originating call set-up signalling.

* * * * *